United States Patent [19]
Kawahara et al.

[11] Patent Number: 5,735,763
[45] Date of Patent: Apr. 7, 1998

[54] TENSION MEMBER FOR BELT AND BELT INCLUDING THE SAME

[75] Inventors: Hideaki Kawahara; Masaki Ochiai; Eijiro Nakashima; Yuji Takeuchi, all of Kobe, Japan

[73] Assignee: Bando Chemical Industries, Ltd., Kobe, Japan

[21] Appl. No.: 680,650

[22] Filed: Jul. 16, 1996

[30] Foreign Application Priority Data

Jul. 24, 1995 [JP] Japan ................... 7-187198

[51] Int. Cl.$^6$ ....................... D02G 3/28
[52] U.S. Cl. ............... 474/263; 474/268; 57/249; 57/250
[58] Field of Search ................ 474/263, 268, 474/204, 205, 271, 250, 251; 156/137, 138; 57/243, 249, 250

[56] References Cited

U.S. PATENT DOCUMENTS

| | | |
|---|---|---|
| 3,496,783 | 2/1970 | Garbin. |
| 4,009,134 | 2/1977 | Elmer ........................ 260/29.3 |
| 4,409,343 | 10/1983 | Wise ........................ 523/206 |
| 4,498,891 | 2/1985 | Mashimo et al. ........... 474/205 |
| 4,790,802 | 12/1988 | Onoe et al. . |
| 5,077,127 | 12/1991 | Mori et al. ................. 428/390 |
| 5,230,667 | 7/1993 | Nakajima et al. .......... 474/263 |

FOREIGN PATENT DOCUMENTS

| | | |
|---|---|---|
| 4125209 | 2/1993 | Germany. |
| 62-174139 | 11/1987 | Japan. |
| 1213478 | 8/1989 | Japan. |
| 6147274 | 5/1994 | Japan. |

*Primary Examiner*—Roger J. Schoeppel
*Attorney, Agent, or Firm*—Sixbey Friedman Leedom & Ferguson; Gerald J. Ferguson, Jr.; Thomas W. Cole

[57] ABSTRACT

The tension member for a belt of this invention is made from a glass cord. First twist yarns of this glass cord are obtained by paralleling and twisting a plurality of fiber bundles, each including a large number of glass filaments, by a predetermined first twist number. The fiber bundles are previously soaked with a treatment liquid including a mixture of rubber latex and an initial condensation product of resorcinol and formalin as a main component and then heated. The glass cord is fabricated by paralleling a predetermined number of the first twist yarns and twisting them by a predetermined final twist number, so as to squeeze and substantially eliminating spaces among the first twist yarns. Accordingly, the belt including this glass cord as the tension member can achieve good water resistance because externally intruding water is prevented from being held within the belt.

8 Claims, 5 Drawing Sheets

TENSION MEMBER FOR BELT AND BELT INCLUDING THE SAME

BACKGROUND OF THE INVENTION

The present invention relates to a tension member to be buried in various types of belts and a belt including the tension member.

A glass cord made from glass fiber is generally buried as a tension member in the main body of a belt for power transmission such as a toothed belt in order to improve the strength, the toughness or the dimensional stability of the belt.

For example, in a timing belt (synchronous belt) for driving a cam shaft of an automobile engine, the glass cord has the following structure as is shown in an enlarged view of FIG. 4: A plurality of strands, each of which is formed by collecting glass filaments a, are paralleled and twisted so as to obtain a first twist yarn b. A plurality of such first twist yarns b are paralleled and finally twisted in the reverse direction to the first twist so as to obtain the glass cord. A generally used tension member for the timing belt is a cord designated as ECG150-3/13 fabricated as follows: Three strands each having a filament diameter of 9 µm and a size of 15,000 yards/lb are paralleled and twisted by a twist number of 2.0 times per inch so as to obtain a first twist yarn. Thirteen first twist yarns are paralleled and finally twisted by a twist number of 2.0 times per inch so as to obtain the cord.

In driving an automobile under a moist condition such as in the rain, the strength of the timing belt is largely decreased because moisture accelerates fatigue degradation of the glass cord owing to the bend thereof. As a result, the timing belt can be disadvantageously cut with ease.

As a known countermeasure against this disadvantage, the water bending fatigue resistance (resistance against flexibility degradation due to water) is conventionally improved as is disclosed in, for example, Japanese Laid-Open Utility Model Publication No. 62-174139. Specifically in this publication, the first twist number and the final twist number of the glass cord are set in the range between 2.0 and 2.5 times per 25 mm and between 1.4 and 2.0 times per 25 mm, respectively.

However, in consideration of various unfavorable conditions in the engine room of an automobile such as the temperature increase, the conventional countermeasure is actually insufficient and still has room for improvement.

SUMMARY OF THE INVENTION

The present invention was devised to overcome the aforementioned problems, and the object is providing a tension member for a belt made from a glass cord fabricated by paralleling and finally twisting a plurality of first twist yarns with excellent water bending fatigue resistance, so that the belt cannot be degraded in its strength even under moist conditions.

In order to achieve the object of the invention, the present inventors have made positive use of the final twist. Specifically, the inventors have found that the bending fatigue of the glass cord (namely, the tension member; the same shall apply hereinafter) is accelerated by moisture because externally intruding water is held in spaces c formed among the first twist yarns b as is shown in FIG. 4 so as to obstruct the adhesion among the first twist yarns b. Therefore, in this invention, the spaces c are eliminated by increasing the final twist number as much as possible as compared with that in the conventional cord, thereby attaining the excellent water bending fatigue resistance.

The present invention provides a tension member for a belt fabricated by paralleling a plurality of glass fiber bundles, which are previously heated after being soaked with an RFL treatment liquid, and twisting the paralleled bundles by a predetermined first twist number so as to obtain a first twist yarn and by paralleling a predetermined number of the first twist yarns and finally twisting the paralleled first twist yarns in the reverse direction to the first twist by a predetermined final twist number. In this tension member, spaces among the first twist yarns are squeezed and substantially eliminated by the final twist.

In this manner, the spaces among the first twist yarns are squeezed and substantially eliminated by the final twist, and hence, it is possible to prevent externally intruding water from being held within the tension member. As a result, the water bending fatigue resistance of the belt is largely improved.

The glass fiber is not herein specified but can be, for example, a so-called non-alkaline glass fiber. Preferably, a high-strength glass fiber having a filament diameter of 8 µm or less is used, so that the diameter of the tension member can be decreased without degrading the strength of the cord, resulting in advantageously improving the flexibility of the belt.

Furthermore, the RFL treatment liquid is a mixture of latex and an initial condensation product of resorcinol and formalin. The latex is not herein specified but can be any latex such as a styrene-butadiene-vinylpyridine copolymer, chlorosulfonated polyethylene, nitrile rubber, hydrogenated nitrile rubber, epichlorohydrin, SBR, chloroprene-rubber, chlorinated butadiene, an olefin-vinylester copolymer, and natural rubber, or a mixture of two or more of them.

The final twist number is preferably set at 2.4 times or more per inch. Thus, the spaces are advantageously squeezed.

When the final twist number is 2.4 times or more per inch, the first twist number is preferably set at 1.0 time or more per inch. Thus, a failure in paralleling the fibers is avoided, thereby preventing the strength degradation of the tension member due to such a failure.

When the final twist number is 2.4 times or more per inch, the upper limit of the final twist number is preferably set at 3.5 times per inch. Thus, the water bending fatigue resistance of the belt is improved while suppressing the elongation of the tension member in driving the belt as well as the elongation of the belt due to the elongation of the tension member, thereby improving the dimensional stability of the belt.

When the final twist number is 2.4 times or more per inch and the first twist number is 1.0 time or more per inch, the upper limit of the first twist number is preferably set at 4.0 times per inch. Thus, the elongation of the tension member in driving the belt as well as the elongation of the belt due to the elongation of the tension member can be suppressed, thereby improving the dimensional stability of the belt.

Preferably, the glass fiber is a glass filament and the total number of the glass filaments in the tension member is in the range between 4000 and 7000. When the total number of the filaments is less than 4000, it is difficult to attain sufficient strength. When the total number exceeds 7000, the surface of the resultant glass cord is so distorted that the glass cord is inferior in flexibility.

Furthermore, the glass cord is preferably covered with a coat including rubber as a main component. Thus, the adhesion of the tension member to rubber used as a main body of the belt is improved, and the stability in driving the belt is also improved. As a result, the water bending fatigue resistance is further improved.

The rubber included in the coat for the glass cord is not herein specified but is preferably a halogen including substance such as rubber chloride, poly(vinyl chloride), chloroprene-rubber and chlorosulfonated polyethylene.

As an example of the method of forming the coat, the tension member for a belt is soaked with rubber cement and heated. A solvent for solving the rubber and the like is not herein specified, but aromatic hydrocarbon such as benzene, toluene and xylene, and halogenated aliphatic hydrocarbon such as ethers and trichloroethylene are generally preferred.

Furthermore, the invention provides a belt comprising the above-described tension member for a belt in which the spaces are substantially eliminated, in which the tension member is buried in a main body of the belt so as to extend in the longitudinal direction of the belt. The application of the tension member can provide the belt with excellent water bending fatigue resistance.

Furthermore, the invention provides an endless belt for power transmission comprising a tension member entirely extending on the belt in the longitudinal direction of the belt, an outer rubber bonded to the outer side of the tension member and an inner rubber bonded to the inner side of the tension member. This tension member is made from a glass cord fabricated by paralleling and twisting a plurality of fiber bundles made from glass fibers, which are previously heated after being soaked with an RFL treatment liquid, by a first twist number of 1.0 through 4.0 times per inch so as to obtain a first twist yarn, and by paralleling and twisting a plurality of the first twist yarns in the reverse direction to first twist by a final twist number of 2.4 through 3.5 times per inch, so as to substantially eliminate spaces among the first twist yarns.

In addition, the invention provides an endless toothed belt comprising a tension member made from a glass cord which extends in the longitudinal direction of the belt and is spirally wound with a predetermined pitch in the transverse direction of the belt, a backing rubber bonded to the outer side of the tension member and a large number of tooth rubbers bonded to the inner side of the tension member with a predetermined pitch. This glass cord is fabricated by paralleling and twisting a plurality of fiber bundles made from glass fibers, which are previously heated after being soaked with an RFL treatment liquid, by a first twist number of 1.0 through 4.0 times per inch so as to obtain a first twist yarn, and by paralleling and twisting a plurality of the first twist yarns in the reverse direction to first twist by a final twist number of 2.4 through 3.5 times per inch, so as to substantially eliminate spaces among the first twist yarns, and the surface of the glass cord is covered with a rubber coat.

DETAILED DESCRIPTION OF THE INVENTION

Figure 2:
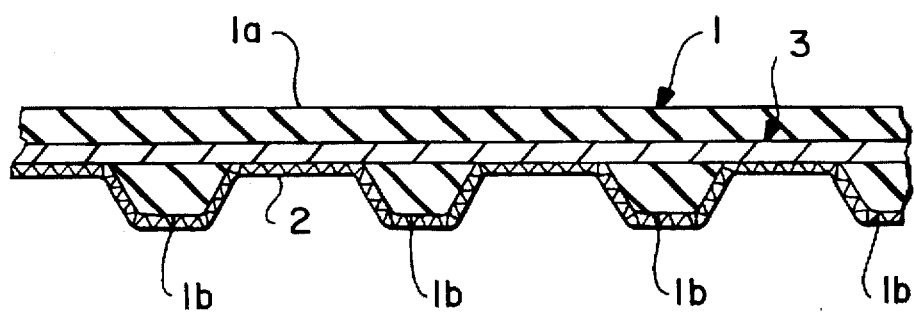
FIG. 2 is a longitudinal sectional view of the entire structure of a toothed belt.

FIG. 2 shows a toothed belt according to an embodiment of this invention. A main body 1 of the toothed belt comprises a glass cord 3 as a tension member which extends in the longitudinal direction of the belt (i.e., in the horizontal direction in FIG. 2) and is spirally wound with a predetermined pitch in the transverse direction of the belt. The tension member is provided with a backing rubber 1a, on its outer side, extending in the longitudinal direction of the belt and having a rectangular section, and is also provided with a large number of tooth rubbers 1b, on its inner side, with a predetermined pitch in the longitudinal direction of the belt. The tooth rubbers 1b are covered with a facing fabric 2 adhered to the inner surface of the main body 1.

Specifically, rubber for the main body 1 is a rubber composition including hydrogenated nitrile rubber as a main component. The facing fabric 2 includes 6, 6 nylon yarns extending in the transverse direction of the belt and wooly finished industrial 6, 6 nylon yarns extending in the longitudinal direction of the belt.

Figure 1:
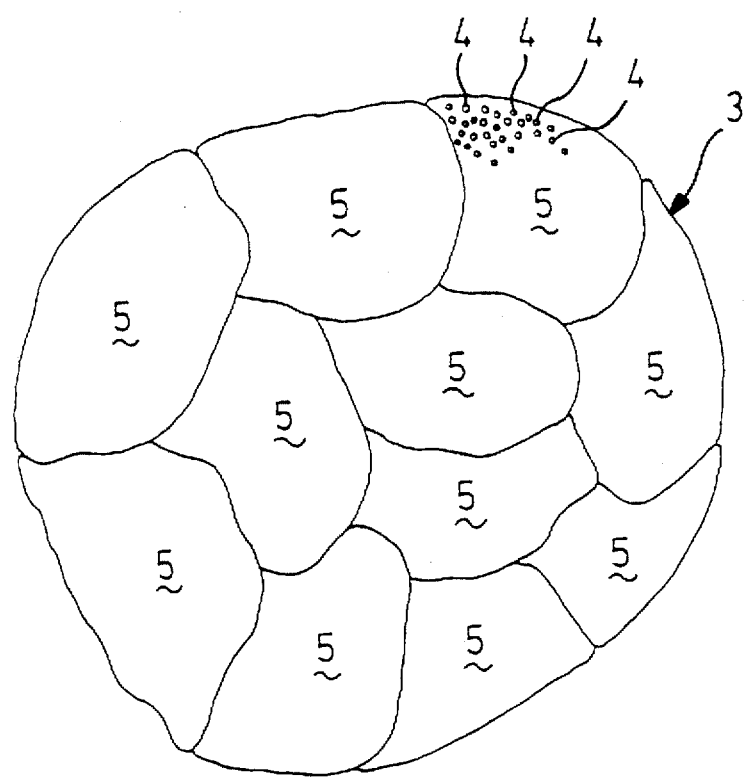
FIG. 1 is an enlarged cross-sectional view of a glass cord according to an embodiment of the invention.

The glass cord 3 is obtained by paralleling a predetermined number of first twist yarns 5 and finally twisting the first twist yarns 5 in the reverse direction to the first twist by a predetermined final twist number as is shown in an enlarged view of FIG. 1. Each of the first twist yarns 5 is obtained by paralleling a plurality of fiber bundles and twisting the bundles by a predetermined first twist number. Each of the fiber bundles includes a large number of glass filaments 4, and is obtained by soaking the glass filaments with an RFL treatment liquid and then heating the resultant filaments. Therefore, rubber portions made of the RFL treatment liquid are present among the glass filaments 4 of each first twist yarn 5.

This toothed belt is manufactured by a general press fitting method, and includes 133 tooth rubbers 1b disposed with a pitch of 8 mm and has a width of 19 mm. Furthermore, the mating flanks of the respective tooth rubbers 1b opposing each other in the longitudinal direction of the belt are swollen in the shape of an arc.

The first twist number of each first twist yarn 5 of the glass cord 3 is set at 1.0 time or more per inch. The first twist yarns 5 are finally twisted by a final twist number of 2.4 times or more per inch, so as to squeeze and substantially eliminate the spaces among the first twist yarns 5 (see FIG. 4).

The total number of the glass filaments included in the glass cord 3 is set within the range between 4000 and 7000.

The glass cord 3 will now be described more specifically. (Embodiment 1)

A glass filament 4 used in this embodiment is a non-alkaline high-strength glass filament with a diameter of 7 μm. Each fiber bundle is obtained by collecting 200 glass filaments 4. The glass cord of this embodiment is fabricated as follows: Three fiber bundles are paralleled and soaked with a $V_p$-SBR (styrene-butadiene-vinylpyridine copolymer) type RFL treatment liquid with a concentration of 20 wt %, and then heated at a temperature of 240° C. for 1 minute. The resultant bundles are twisted by a first twist number of 2.0 times per inch so as to obtain a first twist yarn 5. Then, eleven first twist yarns 5 are paralleled and twisted by a final twist number of 2.4 times per inch. In this manner, the total number of the glass filaments in the glass cord is 6600 (=200×3×11). This glass cord is used as a tension member, so as to manufacture a toothed belt (having the structure as shown in FIG. 2).

Accordingly, in the glass cord of this embodiment, the spaces among the first twist yarns 5 are squeezed and substantially eliminated by the final twist of 2.4 times per inch. As a result, it is possible to prevent externally intruding water from being held within the glass cord 3, thereby largely improving the water bending fatigue resistance of the toothed belt.

(Embodiment 2)

Figure 5:
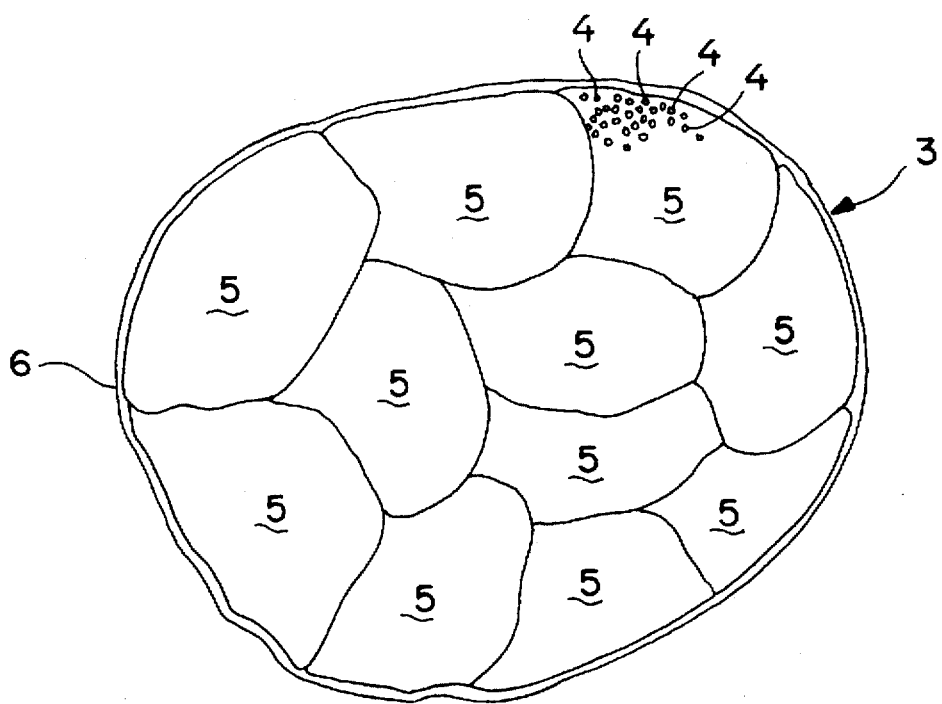
FIG. 5 is an enlarged cross-sectional view of a glass cord according to another embodiment of the invention.
Figure 4:
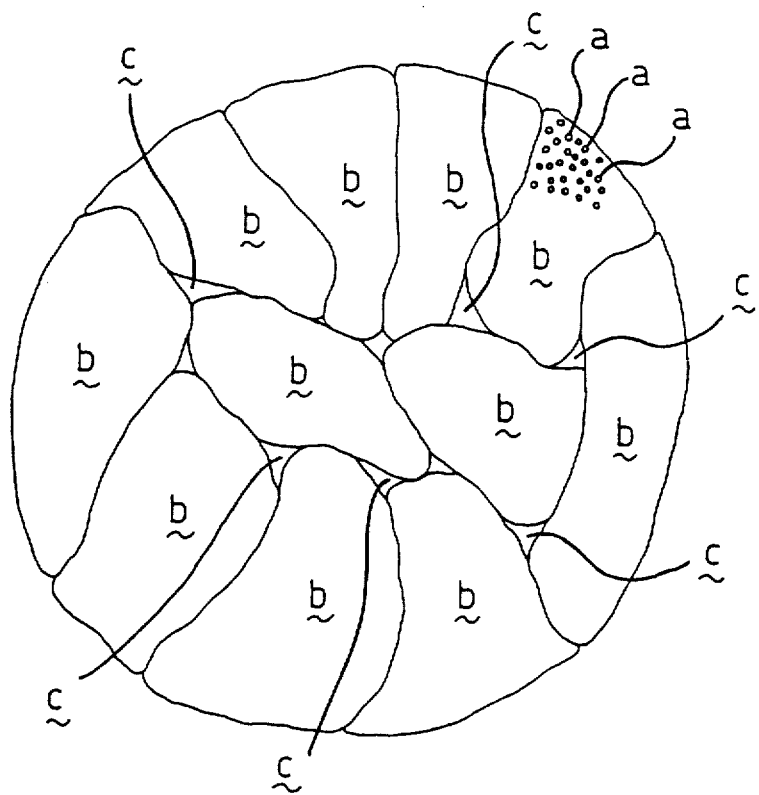

A glass cord fabricated in the same manner as in Embodiment 1 is soaked with a 20 wt % solution of rubber cement including chlorosulfonated polyethylene as a main component, and the resultant cord is dried at a temperature of 150° C. for 1 minute, thereby completing a glass cord having a rubber coat 6 of this embodiment as shown in FIG. 5. This glass cord is used as a tension member, so as to manufacture a toothed belt (having the structure as is shown in FIG. 2).

(Embodiments 3 through 13 and Comparative Examples 1 through 5)

Sixteen types of glass cords are fabricated in the same manner as described in Embodiment 2 except that the numbers of the first twist and final twist are different. These glass cords are used as tension members, so as to manufacture toothed belts (each having the structure as is shown in FIG. 2) as Embodiments 3 through 13 and Comparative Examples 1 through 5.

The numbers of the first twist and final twist in each of the toothed belts of Embodiments 3 through 13 and Comparative Examples 1 through 5 are listed in Table 1.

(Comparison Test)

The toothed belts of the above-described embodiments and comparative examples are evaluated for their water bending fatigue resistance and elongation as follows:

Conditions for water pour bending fatigue test

Figure 3:
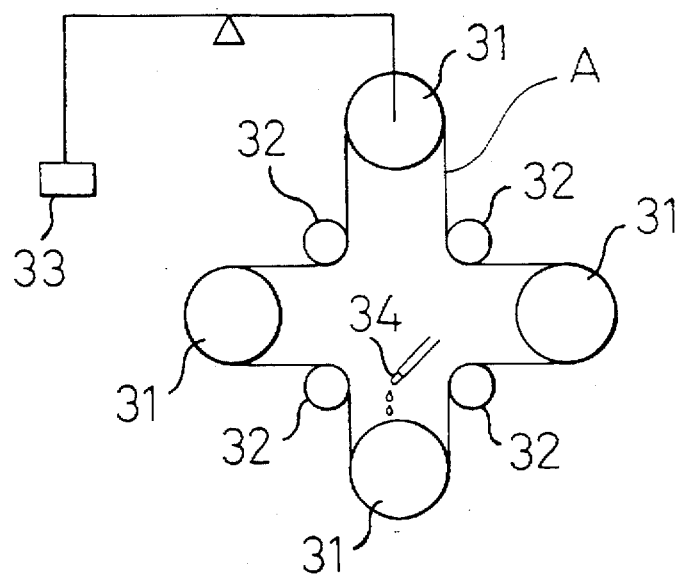
FIG. 3 is a schematic diagram for showing the configuration of a belt driving test machine used for evaluation.

A belt driving test machine as is shown in FIG. 3 is used for the evaluation of the water bending fatigue resistance. This machine comprises four large pulleys 31 disposed in the vertical and horizontal relationship as shown in FIG. 3 and four small pulleys 32 each having a diameter of 30 mm and disposed between the adjacent large pulleys 31. In this test, a sample belt A is wound and stretched around the pulleys 31 and 32, and a load of 40 kgf is applied to the sample belt A by using a weight 33. Under these conditions, the large pulleys 31 are rotated at a rotation speed of 5500 rpm with water pouring at a rate of 1 litter per hour from a water pour port 34 so as to wet the bottom land of the sample belt A, so that the sample belt A is driven until it is ruptured.

Conditions for elongation test (bending test)

A sample belt is driven by using a test machine having the same configuration as that shown in FIG. 3, so that an elongation rate (%) of the sample belt is measured when the belt is bent $1 \times 10^8$ times (the belt is bent four times per cycle). In this test, water is not poured.

Evaluation results

The results of the evaluation are also shown in Table 1.

As is obvious from the results shown in Table 1, the water bending fatigue resistance can be improved by appropriately setting the final twist number of the glass cord. For example, the water bending fatigue resistance of Embodiment 13, which is lowest among Embodiments 1 through 13, is improved by approximately 30% as compared with that of Comparative Example 2 which is highest among Comparative Examples 1 through 5.

Now, Embodiments 1 through 13 are examined in more detail. First, in Embodiment 5, wherein the final twist number exceeds 3.5 times per inch, the water bending fatigue resistance is improved similarly to or more than those of the other embodiments, but Embodiment 5 is inferior in the elongation. Embodiment 13 is similarly inferior in the elongation. This reveals that the final twist number is preferably set at 3.5 times or more per inch.

Furthermore, in Embodiment 12, wherein the first twist number exceeds 4.0 times per inch, the water bending fatigue resistance is improved similarly to or more than those of the other embodiments, but this embodiment is inferior in the elongation. This reveals that the first twist number is preferably set at 4.0 times or less per inch.

In other words, by setting the final twist number at 2.0 through 3.5 times per inch and the first twist number at 4.0 times or less per inch, and more preferably 1.0 through 4.0 times per inch, the water bending fatigue resistance of a glass cord can be effectively improved while preventing disadvantages such as the strength degradation of the glass cord due to the failure in paralleling and the elongation of the belt which can be otherwise caused by increasing the twist number.

In addition, comparison between Embodiments 1 and 2 reveals that the water resistance driving performance of the belt can be further improved by coating a glass cord with rubber cement.

TABLE 1

| | First twist number (times/inch) | Final twist number (times/inch) | Water pour bending life time (times) | Belt elongation (%) |
|---|---|---|---|---|
| Embodiment 1* | 2.0 | 2.4 | $2.6 \times 10^7$ | 0.02 |
| Embodiment 2 | 2.0 | 2.4 | $3.2 \times 10^7$ | 0.02 |
| Embodiment 3 | 2.0 | 2.9 | $4.3 \times 10^7$ | 0.03 |
| Embodiment 4 | 2.0 | 3.5 | $5.2 \times 10^7$ | 0.06 |
| Embodiment 5 | 2.0 | 3.7 | $4.3 \times 10^7$ | 0.12 |
| Embodiment 6 | 3.0 | 2.4 | $3.6 \times 10^7$ | 0.03 |
| Embodiment 7 | 3.0 | 2.9 | $4.3 \times 10^7$ | 0.03 |
| Embodiment 8 | 3.0 | 3.5 | $3.5 \times 10^7$ | 0.06 |
| Embodiment 9 | 4.0 | 2.4 | $3.3 \times 10^7$ | 0.03 |
| Embodiment 10 | 4.0 | 2.9 | $3.2 \times 10^7$ | 0.04 |
| Embodiment 11 | 4.0 | 3.5 | $3.8 \times 10^7$ | 0.07 |
| Embodiment 12 | 4.2 | 2.9 | $4.6 \times 10^7$ | 0.12 |
| Embodiment 13 | 4.5 | 4.0 | $8.6 \times 10^6$ | 0.16 |
| Comparative Example 1 | 2.0 | 1.7 | $3.2 \times 10^6$ | 0.01 |
| Comparative Example 2 | 2.0 | 2.0 | $6.6 \times 10^6$ | 0.02 |
| Comparative Example 3 | 4.0 | 1.7 | $2.2 \times 10^6$ | 0.02 |
| Comparative Example 4 | 4.5 | 2.0 | $4.5 \times 10^6$ | 0.13 |
| Comparative Example 5 | 4.8 | 1.7 | $2.6 \times 10^6$ | 0.15 |

*Note: The glass cord of Embodiment 1 is not covered with rubber.

What is claimed is:

1. A tension member for a belt comprising a plurality of first twist yarns parallel together and reverse twisted, each of said first twist yarns being formed by a plurality of bundles of parallel glass fibers, which are heated after being soaked with a treatment liquid including, as a main component, a mixture of rubber latex and an initial condensation product of resorcinol and formalin, said bundles each being twisted by a first twist number that is between about 1.0 and 4.5 times per inch in order to obtain a first twist yarn, wherein a plurality of the first twist yarns are arranged mutually parallel and are twisted in the reverse direction to said first twist by a final twist number that is between about 2.4 and 4.0 times per inch, wherein spaces among the first twist yarns are squeezed and substantially eliminated by said final twist.

2. The tension member for a belt of claim 1, wherein the final twist number is 3.5 times or less per inch.

3. The tension member for a belt of claim 1, wherein the first twist number is 4.0 times or less per inch.

4. The tension member for a belt of claim 1, wherein the glass fibers are glass filaments, and a total number of the glass filaments included in the tension member for a belt is in the range between 4000 and 7000.

5. The tension member for a belt of claim 1, wherein a surface of the tension member is covered with a coat including rubber as a main component.

6. A belt comprising the tension member for a belt of claim 1, wherein the tension member is buried in a main body of the belt in order to extend a longitudinal direction of the belt.

7. An endless belt for power transmission comprising a tension member extending along the belt in a longitudinal direction of the belt, a backing rubber bonded to an outer side of the tension member, and a tooth rubber bonded to an inner side of the tension member, wherein the tension member is made from a glass cord fabricated by paralleling and twisting a plurality of fiber bundles made from glass fibers, which are heated after being soaked with a treatment liquid including, as a main component, a mixture of rubber latex and an initial condensation product of resorcinol and formalin, said fibers being twisted by a first twist number of 1.0 through 4.0 times per inch in order to obtain a first twist yarn, wherein a plurality of the first twist yarns are arranged mutually parallel and are twisted in the reverse direction to first twist by a final twist number of 2.4 through 3.5 times per inch in order to substantially eliminate spaces among the first twist yarns.

8. An endless toothed belt comprising a tension member made from a glass cord which extends in a longitudinal direction of the belt and is spirally wound with a predetermined pitch in a transverse direction of the belt, a backing rubber bonded to an outer side of the tension member and a large number of tooth rubbers bonded to an inner side of the tension member with a predetermined pitch, wherein the glass cord is fabricated by paralleling and twisting a plurality of fiber bundles made from glass fibers which are heated after being soaked with a treatment liquid including, as a main component, a mixture of rubber latex and an initial condensation product of resorcinol and formalin, the resulting fiber bundles being twisted by a first twist number of 1.0 through 4.0 times per inch in order to obtain a first twist yarn, wherein a plurality of the first twist yarns are parallel and twisted in the reverse direction to first twist by a final twist number of 2.4 through 3.5 times per inch in order to substantially eliminate spaces among the first twist yarns, and a surface of the tension member is covered with a rubber coat.

* * * * *

UNITED STATES PATENT AND TRADEMARK OFFICE
CERTIFICATE OF CORRECTION

Page 1 of 2

Figure 4:
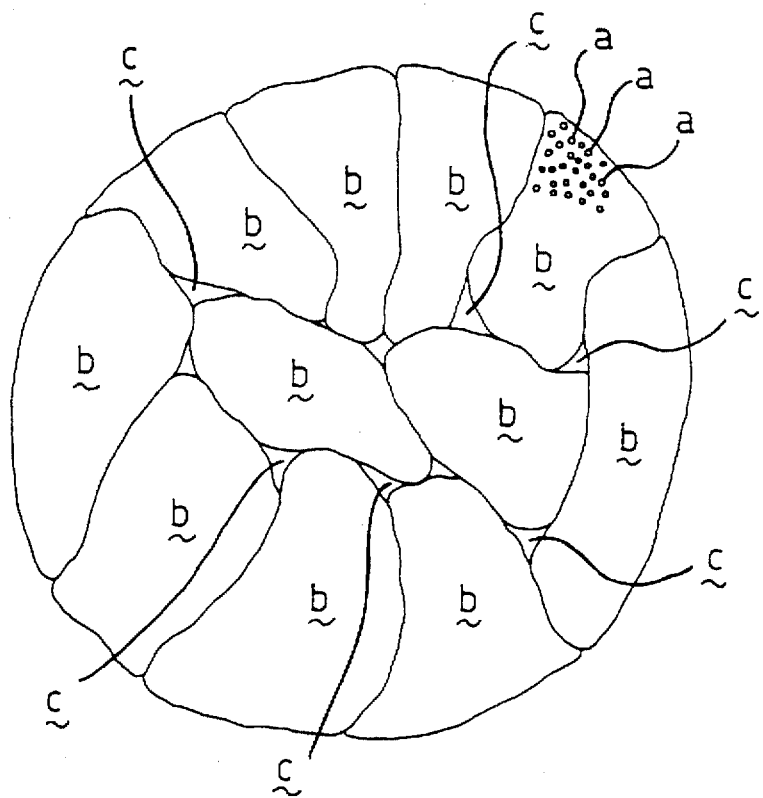
FIG. 4 is a diagram for showing a conventional glass cord correspondingly to FIG. 1.

PATENT NO. : 5,735,763
DATED : Apr. 7, 1998
INVENTOR(S) : Hideaki Kawahara; Masaki Ochiai; Eijiro Nakashima; Yuji Takeuchi It is certified that error appears in the above-indentified patent and that said Letters Patent is hereby corrected as shown below:

In the drawings, please delete "Fig. 4" and insert --Fig. 4 (Prior Art)--.

Signed and Sealed this

Twenty-second Day of September, 1998

Attest:

BRUCE LEHMAN

*Attesting Officer*     *Commissioner of Patents and Trademarks*